(12) United States Patent
Hillen et al.

(10) Patent No.: US 9,033,779 B2
(45) Date of Patent: May 19, 2015

(54) AIR DIVERTER FOR A CLEANING SYSTEM OF A COMBINE HARVESTER

(71) Applicant: CNH America LLC, New Holland, PA (US)

(72) Inventors: Curtis Frederick Hillen, Lititz, PA (US); Kevin Nicholas Scotese, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/689,310

(22) Filed: Nov. 29, 2012

(65) Prior Publication Data
US 2014/0148229 A1 May 29, 2014

(51) Int. Cl.
| | | |
|---|---|---|
| *A01F 12/48* | (2006.01) | |
| *B07B 1/55* | (2006.01) | |
| *B08B 5/00* | (2006.01) | |
| *A01F 12/44* | (2006.01) | |

(52) U.S. Cl.
CPC .................................... *A01F 12/444* (2013.01)

(58) Field of Classification Search
CPC .............................. A01F 12/444; A01F 12/48
USPC ............ 460/99, 101, 100; 209/639, 923, 154, 209/138, 147
See application file for complete search history.

(56) References Cited

U.S. PATENT DOCUMENTS

| | | | | |
|---|---|---|---|---|
| 1,922,986 A | * | 8/1933 | Stith .............................. | 209/363 |
| 3,043,427 A | * | 7/1962 | Eisert .............................. | 209/26 |
| 3,603,063 A | * | 9/1971 | Stroburg et al. ................ | 56/14.6 |
| 3,759,380 A | * | 9/1973 | Mathews ......................... | 209/22 |
| 3,813,184 A | | 5/1974 | Temple et al. | |
| 3,833,006 A | * | 9/1974 | Temple ........................... | 460/99 |
| 4,307,732 A | * | 12/1981 | De Busscher et al. .......... | 460/99 |
| 4,353,376 A | * | 10/1982 | Schuler ............................ | 460/67 |
| 4,401,128 A | * | 8/1983 | Fisher ............................. | 460/99 |
| 4,465,082 A | * | 8/1984 | Strubbe ........................... | 460/98 |
| 4,480,643 A | * | 11/1984 | Alm ................................ | 460/120 |
| 4,561,972 A | * | 12/1985 | Alm ................................ | 209/254 |
| 4,589,425 A | * | 5/1986 | Mitchell, Jr. .................... | 460/99 |
| 4,906,219 A | | 3/1990 | Matousek et al. | |
| 5,098,341 A | | 3/1992 | Kuchar | |
| 5,387,154 A | * | 2/1995 | Peters ............................. | 460/99 |
| 5,428,945 A | * | 7/1995 | von Allworden et al. ..... | 56/12.8 |
| 5,558,576 A | * | 9/1996 | Meyers ........................... | 460/99 |
| 5,624,315 A | * | 4/1997 | Jonckheere ..................... | 460/99 |
| 5,795,223 A | * | 8/1998 | Spiesberger et al. ......... | 460/102 |

(Continued)

FOREIGN PATENT DOCUMENTS

WO    WO 2008149233 A2 * 12/2008 ............. A01F 12/44

*Primary Examiner* — Árpád Fábián-Kovács
(74) *Attorney, Agent, or Firm* — Seyed V. Sharifi T.; Patrick M. Sheldrake (57) ABSTRACT

A cleaning system for a combine harvester that includes a cleaning shoe having a sieve, a cleaning fan, an air plenum and a pair of air diverters is provided. The cleaning fan is rotatably driven for generating a flow of air and positioned within the air plenum. The air plenum extends across the entire length of the cleaning fan and includes an inlet for the intake of air, an outlet downstream the inlet for directing the flow of air in a first direction, lateral walls forming a portion of the outlet, and a bottom wall extending between the lateral walls. The pair of air diverters extends inwardly from the lateral walls. Each air diverter is configured substantially as a pyramid having a rounded corner that extends inwardly from the lateral wall and upwardly from the bottom wall.

21 Claims, 6 Drawing Sheets

(56) References Cited

U.S. PATENT DOCUMENTS

| | | | |
|---|---|---|---|
| 5,895,319 A | 4/1999 | Matousek et al. | |
| 6,435,965 B2 * | 8/2002 | Visagie | 460/45 |
| 6,585,584 B2 | 7/2003 | Buermann | |
| 6,773,343 B2 * | 8/2004 | Grywacheski et al. | 460/99 |
| 6,921,330 B2 * | 7/2005 | Grywacheski et al. | 460/100 |
| 6,979,261 B1 * | 12/2005 | Day et al. | 460/59 |
| 7,066,810 B2 * | 6/2006 | Farley et al. | 460/112 |
| 7,322,882 B2 | 1/2008 | Duquesne et al. | |
| 7,399,223 B2 * | 7/2008 | Weichholdt et al. | 460/101 |
| 7,455,584 B2 * | 11/2008 | Farley et al. | 460/111 |
| 7,553,226 B2 | 6/2009 | Dhont et al. | |
| 7,559,833 B2 * | 7/2009 | Isaac et al. | 460/111 |
| 7,670,219 B2 * | 3/2010 | Matousek et al. | 460/100 |
| 7,841,931 B2 * | 11/2010 | Straeter | 460/101 |
| 8,052,374 B2 * | 11/2011 | Ricketts | 415/53.1 |
| 8,221,064 B2 * | 7/2012 | Ricketts et al. | 415/184 |
| 8,286,798 B2 * | 10/2012 | Ricketts et al. | 209/138 |
| 8,608,534 B1 * | 12/2013 | Stahl et al. | 460/99 |
| 2002/0037758 A1 | 3/2002 | Visagie et al. | |
| 2002/0086722 A1 | 7/2002 | Kuhn et al. | |
| 2004/0226275 A1 * | 11/2004 | Baumgarten et al. | 56/153 |
| 2006/0270473 A1 | 11/2006 | Straeter | |
| 2006/0287018 A1 | 12/2006 | Weichholdt | |
| 2008/0016833 A1 | 1/2008 | Sheidler et al. | |
| 2009/0095662 A1 | 4/2009 | Redekop et al. | |
| 2011/0034222 A1 | 2/2011 | Ricketts et al. | |
| 2012/0315964 A1 * | 12/2012 | Biggerstaff | 460/99 |

* cited by examiner

AIR DIVERTER FOR A CLEANING SYSTEM OF A COMBINE HARVESTER

BACKGROUND OF THE INVENTION

The present invention relates generally to a cleaning system for a combine harvester. In particular, the present invention relates to an air diverter for a combine harvester to improve air flow distribution through the cleaning system.

Combines are old and well known in the art. They are available in various designs and models to perform the basic functions of harvesting, threshing and cleaning of grain or other agricultural material.

A typical combine includes a crop harvesting apparatus which reaps mature grain stalks and then feeds the grain stalks to a separating or threshing apparatus. Preferably, the threshing apparatus includes a power-driven rotor mounted inside a stationary cylindrical threshing cage. The rotor threshes and separates the grain from the material other than grain. In such a combine the grain is threshed several times repeatedly, but gently, as it spirals around the rotor and passes through openings in the threshing cage. Essentially, most material other than grain stays within the threshing cage and is directed out the rear end of the combine.

While the threshing apparatus acts to separate a substantial portion of the crop or grain from the material other than grain, some chaff or straw is directed out through the openings in the cage along with the grain and a further cleaning or separating action is required. Further separation is normally achieved in a cleaning section.

The cleaning section includes oscillating cleaning sieves. The cleaning sieves are located below the threshing cage to receive the grain and other material expelled from the cage. The oscillation of the sieves arranges the material in a crop mat or veil on top of the sieves. By forcing a stream of air upwardly through the sieves chaff, straw and other lighter material in the crop mat are separated from the heavier grain and directed out through the end of the combine by the air flow. The heavier seeds or grain fall through the sieves into a collector.

With the increased power and output demands of modern grain combines, cleaning section capacity has become a limiting factor. The most readily achieved method of increasing overall combine capacity is by increasing the width of the combine and the sieves to spread the crop material across a wider area and in a thinner veil. Increasing the width of the cleaning sieves, so as to increase cleaning section capacity, also involves having to modify the air flow across the increased size of the cleaning sieves. The inherently uneven air distribution of known cleaning fans is accentuated by an increase in the width of the cleaning sieves. The uneven distribution of such cleaning fans results in poorer performance of the cleaning system, and can lead to decreases in efficiency and output of the cleaning system.

Thus, there is still a need for a cleaning system and, more particularly, a cleaning system that can more effectively blow air to the sieves of the cleaning system to improve efficiency and output. Such a need is satisfied by a cleaning system having an air diverter for a combine harvester of the present invention.

BRIEF SUMMARY OF THE INVENTION

In accordance with a first aspect of a preferred embodiment, the present invention provides a cleaning system for a combine harvester that includes a cleaning shoe having a sieve, a cleaning fan, an air plenum and a pair of air diverters. The cleaning fan is rotatably driven for generating a flow of air towards the cleaning shoe. The air plenum extends across the entire length of the cleaning fan. The air plenum includes an inlet for the intake of air, an outlet downstream the inlet for directing the flow of air in a first direction, lateral walls forming a portion of the outlet, and a bottom wall extending between the lateral walls. The pair of air diverters extends inwardly from the lateral walls. Each air diverter is configured substantially as a pyramid having a rounded corner that extends inwardly from the lateral wall and upwardly from the bottom wall.

In accordance with another aspect of a preferred embodiment, the present invention provides a blower for a cleaning system of a combine harvester that includes a fan, a housing, and an air diverter. The fan generates a flow of air. The housing houses the fan and includes an inlet, a first outlet downstream the inlet for directing the flow of air in a first direction, a second outlet downstream the inlet for directing the flow of air in a second direction, and walls forming at least a portion of the first and second outlets including side walls and a bottom wall of the housing. The air diverter is disposed adjacent the second outlet for redirecting the flow of air inwardly and upwardly. The air diverter has a shape configured substantially as a pyramid having a rounded corner.

In accordance with yet another aspect of a preferred embodiment, the present invention provides a blower for a cleaning system of a combine harvester that includes a fan for generating a flow of air and a housing for housing the fan. The housing includes an inlet, a first outlet downstream the inlet for directing the flow of air in a first direction, a second outlet positioned below the first outlet and downstream the inlet for directing the flow of air in a second direction, and walls forming at least a portion of the first and second outlets including side walls and a bottom wall of the housing. The cleaning system further includes a means for diverting the flow of air inwardly and a portion of the flow of air upwardly to the first outlet. The means for diverting the flow of air is positioned below the first outlet and below the fan.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to the preferred embodiments of the invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

The terms "grain," "tailing," and "crop material" are used throughout the specification for convenience and it should be understood that these terms are not intended to be limiting. Thus, "grain" refers to that part of a crop which is harvested and separated from discardable portions of the crop material.

Figure 1:
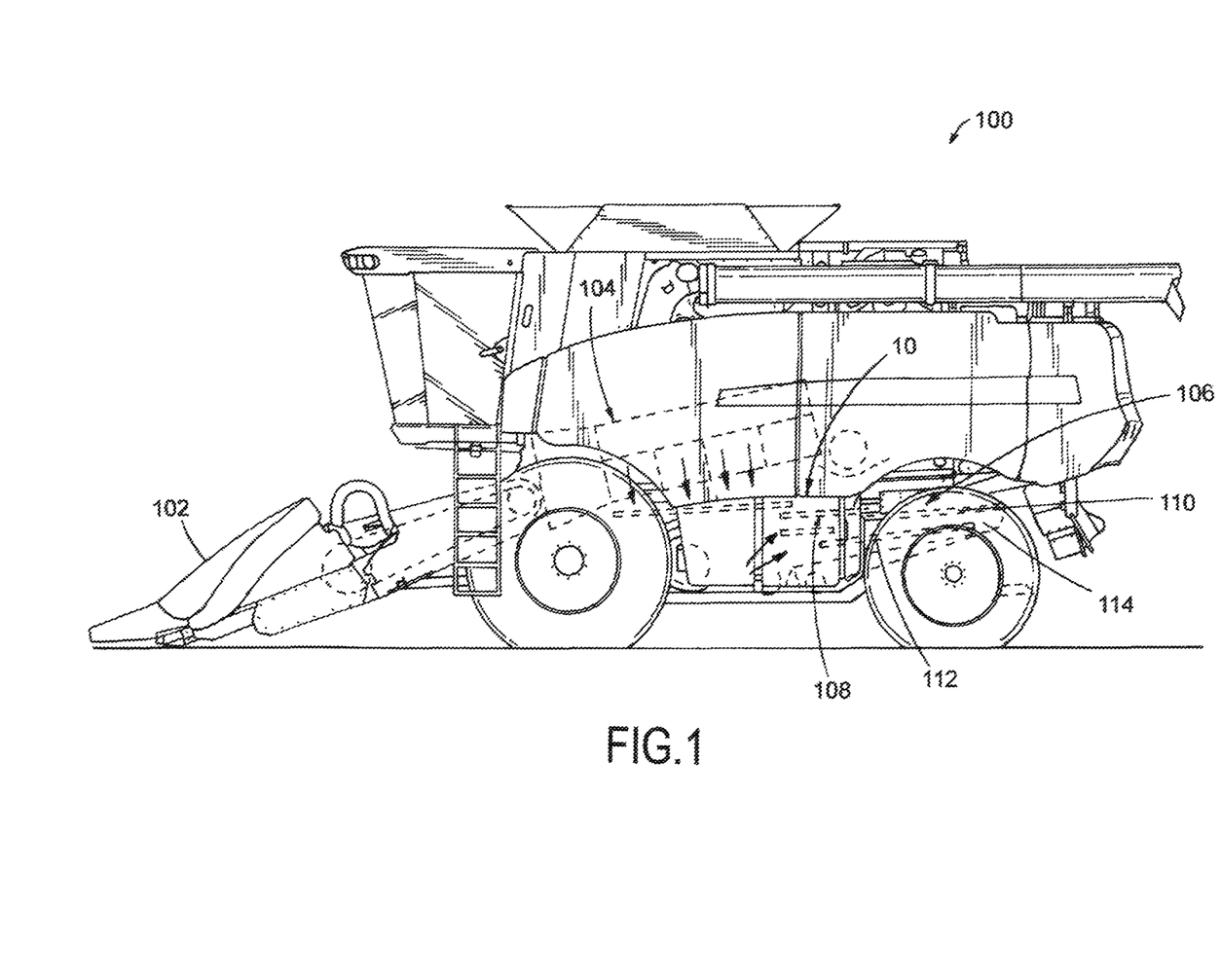
FIG. 1 is a side elevation view of a combine harvester which embodies a cleaning system in accordance with a preferred embodiment of the present invention.
Figure 2:
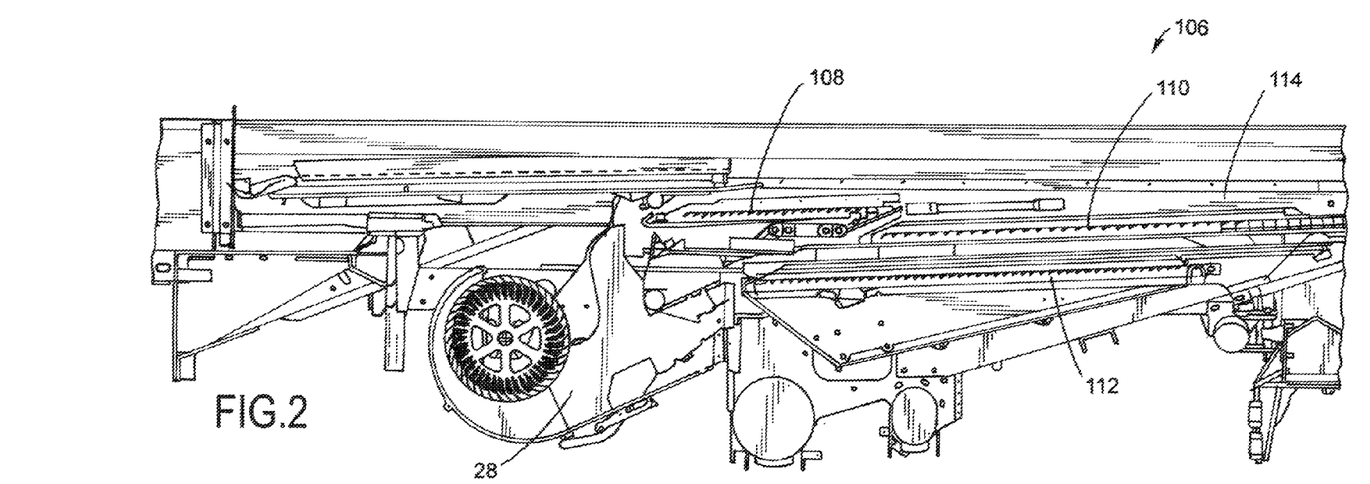
FIG. 2 is an enlarged partial side elevation view of a cleaning system in accordance with a preferred embodiment of the present invention.

FIG. 1 illustrates a combine harvester 100 having a cleaning system 10 of the present invention. The combine harvester 100 can be any conventional harvester having a cleaning system 10 and includes a feeder house 102, a thresher 104, and a cleaning shoe 106, as known in the art. As shown in FIG. 2, the cleaning shoe 106 includes a pre-sieve 108, an upper sieve 110 and a lower sieve 112. The pre-sieve 108, upper sieve 110 and lower sieve 112 are all connected to a shaker frame 114 of the cleaning shoe 106 which functions to shake the sieves in a reciprocative manner. Such cleaning shoes and sieves are known in the art and a further detailed description of their structure, function and operation is not necessary for a complete understanding of the present invention. However, exemplary cleaning shoes applicable to the present invention are further described in detail in U.S. Pat. Nos. 7,553,226; 7,322,882; and 6,585,584, the entire disclosures of which are hereby incorporated by reference herein in their entirety.

Referring to FIGS. 2-8, in a preferred embodiment, the present invention provides a cleaning system 10 that includes a blower 12 having a cleaning fan 14, a housing 16, an air diverter 18, and preferably a pair of air diverters 18, 18', and the cleaning shoe 106. The cleaning shoe 106 includes a sieve, such as sieves 108, 110 and 112.

Figure 3:
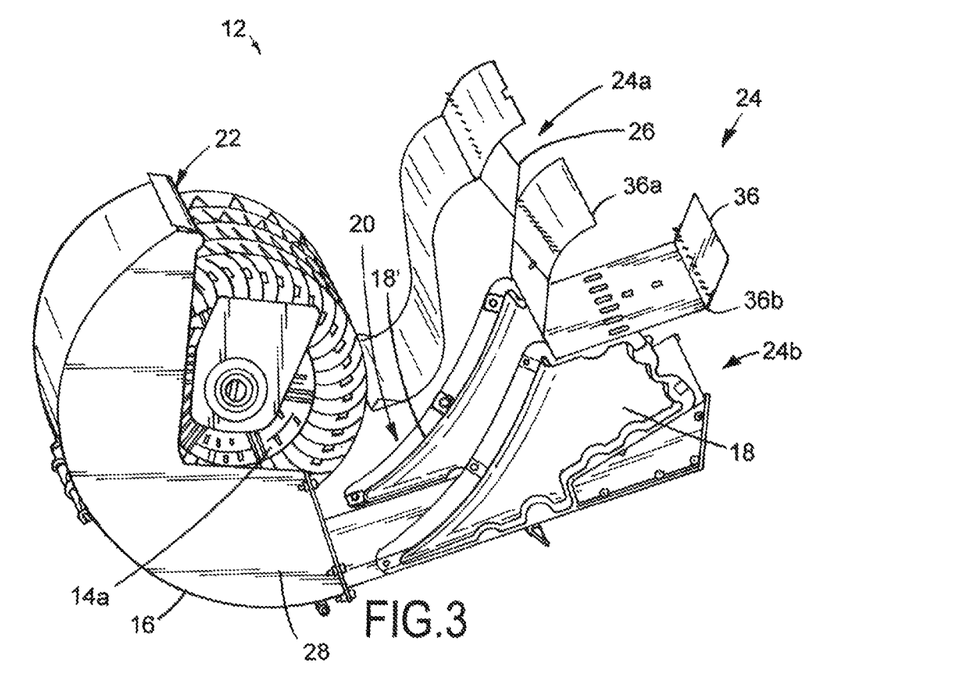
FIG. 3 is perspective view of a cleaning fan and housing of the cleaning system of FIG. 2 without a portion of a lateral wall of the housing.
Figure 4:
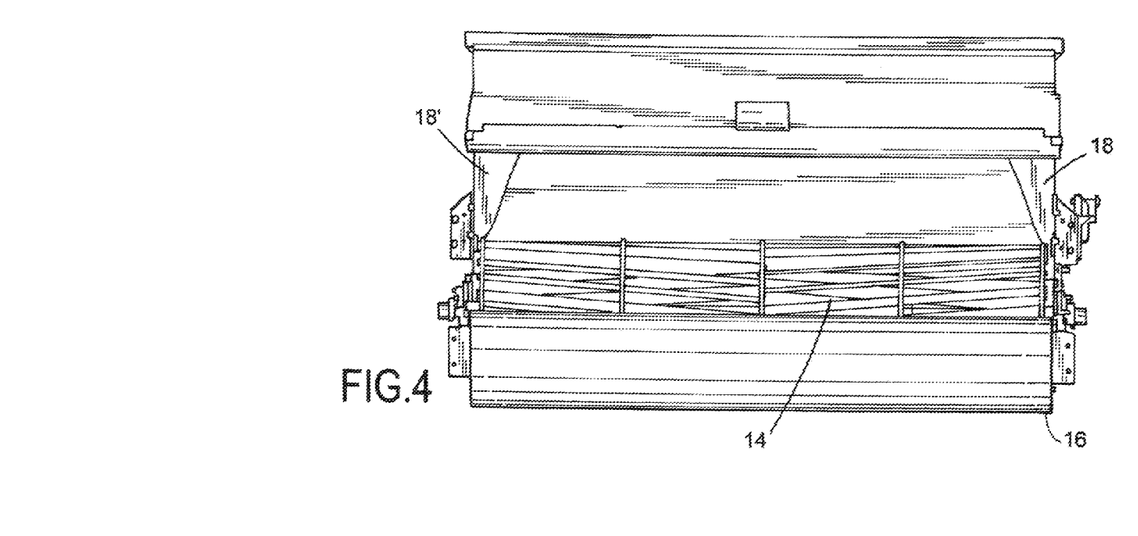
FIG. 4 is a top plan view of the cleaning fan and housing of the cleaning system of FIG. 2 without a portion of a top wall of the housing.

The blower 12 and cleaning fan 14 are best shown in FIGS. 3 and 4, and configured as an elongated traverse blower 12 and fan 14. The cleaning fan 14, also known in the art as a traverse-flow fan has a blower wheel which includes a plurality of elongated blades arranged in a cylindrical pattern such that the blower wheel has a hollow interior. The cleaning fan 14 generates a flow or stream of air that substantially traverses the length of the cleaning fan 14. The flow of air generated by the cleaning fan 14 is directed towards an inlet end of the cleaning shoe 106 by the housing 16.

The housing 16 is configured as best shown in FIGS. 2-5. The housing 16 substantially encloses the cleaning fan 14 forming a plenum 20 that extends across the entire length of the cleaning fan 14 for directing the flow of air generated by the cleaning fan 14.

The housing 16 includes an inlet 22 for the intake of air and an outlet 24 downstream of the inlet 22 for directing the flow of air in a first direction. The outlet 24 includes a first outlet 24a and a second outlet 24b. The first outlet 24a is downstream the inlet 22 and configured for directing the flow of air in a first direction. Specifically, the first direction is a direction towards an inlet of the pre-sieve 108. The second outlet 24b is downstream the inlet 22 and configured for directing the flow of air in a second direction. Specifically, the second direction is a direction towards an inlet of the upper and lower sieves 110, 112. The first outlet 24a is positioned above the second outlet 24b, as best shown in FIG. 3.

The housing 16 is formed by walls, such as lateral walls 26, 28, a bottom wall 30, a rear wall 32, a top wall 34, and a front wall 36. The lateral walls 26, 28 are each positioned adjacent the ends of the cleaning fan 14 and slightly beyond the ends of the cleaning fan 14 so as to allow for the cleaning fan 14 to be enclosed therein. The bottom wall 30 and top wall 34 extend between the lateral walls 26, 28. The front wall 36 also extends between the lateral walls 26, 28.

Figure 5:
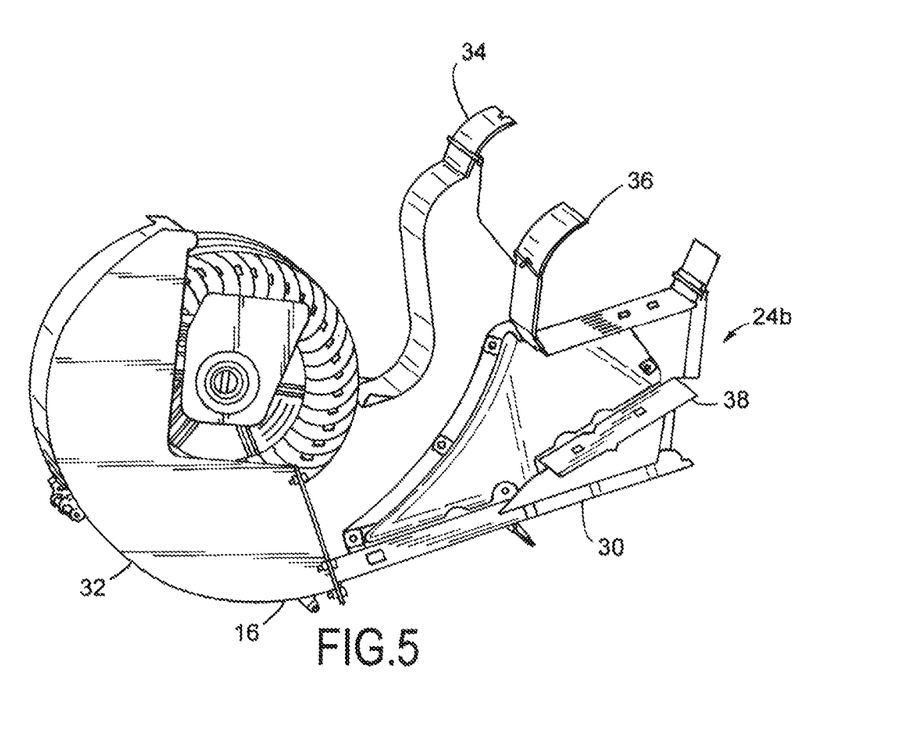
FIG. 5 is a perspective view of the cleaning fan and housing of the cleaning system of FIG. 3 without a left sided air diverter or a portion of the left lateral wall of the housing.

The lateral walls 26, 28, bottom wall 30, top wall 34, and front wall 36 each form a portion of the outlet 24. The front wall 36 is substantially configured as a "V" shaped wall, i.e., so as to have a cross-section substantially in the shape of a "V", as best shown in FIG. 5. The front wall 36 is positioned between the top wall 34 and the bottom wall 30. Thus, the lateral walls 26, 28, top wall 34 and front wall 36 collectively form a first duct having the first outlet 24a and the lateral walls 26, 28, bottom wall 30 and front wall 36 collectively form a second duct having the second outlet 24b.

The front wall 36 includes a top portion 36a and a bottom portion 36b. The top portion 36a and the top wall 34, along with lateral walls 26, 28 collectively form the first duct having the first outlet 24a. The top portion 36a extends in an upwardly and rearwardly direction within the combine harvester 100 so as to direct the flow of air from the cleaning fan 14 to the pre-sieve 108. The bottom portion 36b is situated below the top portion 36a and collectively with the bottom wall 30 and the lateral walls 26, 28 form the second duct having the second outlet 24b. The bottom portion 36b extends in an upwardly and rearwardly direction within the combine harvester 100 so as to direct the flow of air from the cleaning fan 14 to the upper and lower sieves 110, 112. The bottom portion 36b is angled relative to a horizontal plane of the combine harvester 100 at an angle less than the top portion 36a is angled relative to the horizontal plane. More preferably, the bottom portion 36b extends in a direction substantially parallel to a direction of extension of the bottom wall 30.

The housing 16 can optionally include an elongated air baffle 38 that extends between the lateral walls 26, 28. The elongated air baffle 38 is positioned between the front wall 36 and the bottom wall 30 for splitting a flow of air exiting the second outlet 24b. Specifically, the elongated air baffle 38 serves to split the flow of air exiting the second outlet 24b between an upper stream and a lower stream.

Figure 6:
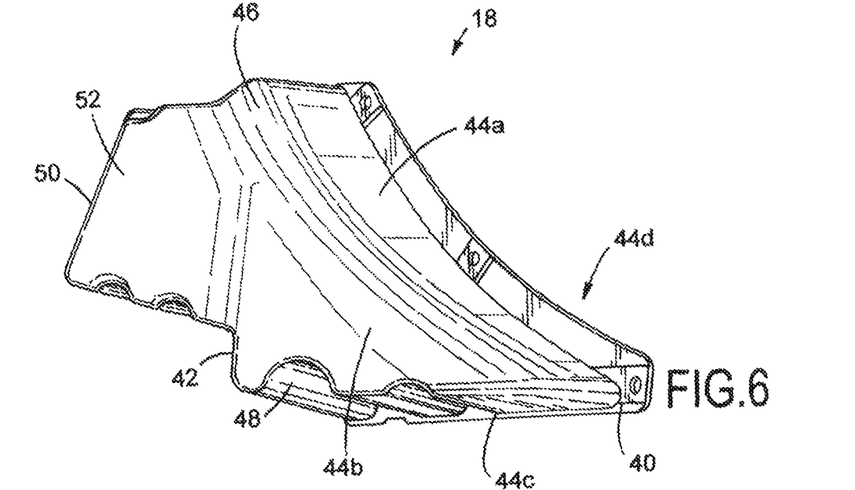
FIG. 6 is a front perspective view of an air diverter in accordance with a preferred embodiment of the present invention.
Figure 7:
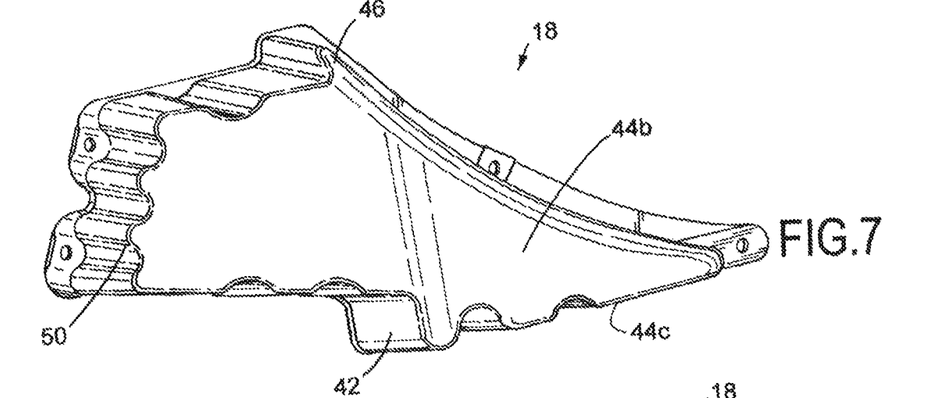
FIG. 7 is a rear perspective view of the air diverter of FIG. 6.
Figure 8:
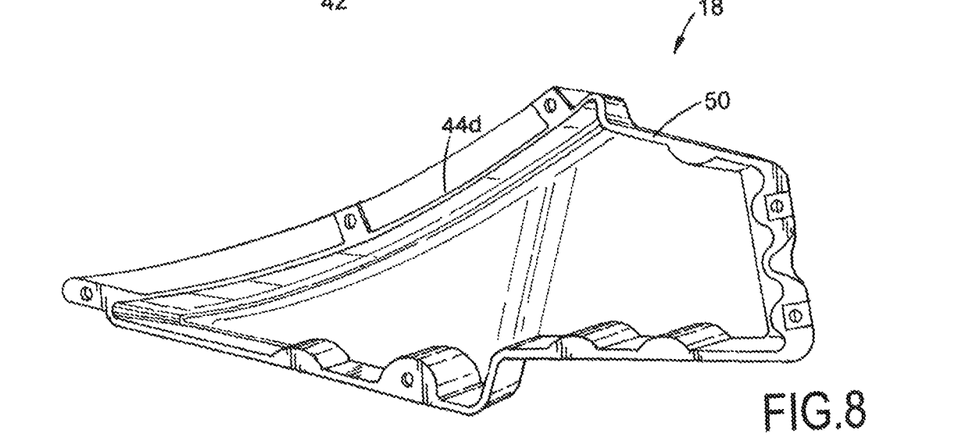
FIG. 8 is a side perspective view of the air diverter of FIG. 6.

The air diverter 18 is configured, as best shown in FIGS. 6-8. FIG. 6 illustrates one of a pair of air diverters extending inwardly from the lateral walls 26, 28 of the housing 16. The air diverter 18 of FIG. 6 represents a left sided air diverter 18, as shown in FIG. 4 when assembled to the housing 16. The right sided air diverter 18' is a minor image of the left sided air diverter 18. Thus, for purposes of convenience only, the foregoing description of the pair of air diverters of the present invention will be described with respect to air diverter 18 only.

The air diverter 18 is configured substantially pyramid-shaped. Preferably, the air diverter 18 is configured as a square pyramid having a tip 40, a base 42 and four sides 44a, 44b, 44c, 44d. Sides 44b, 44c and 44d are substantially planar sides with side 44b substantially at a right angle with respect to side 44c, and side 44c substantially at a right angle with side 44d. In other words, the air diverter 18 has two planar sides at substantially right angles to each other. Side 44a is a curved side, and more preferably a concave curved side 44a of the air diverter 18. The air diverter 18 has a first corner 46 between sides 44a and 44b that is a rounded corner (or a concave curved corner) 46. Side 44a and the first corner 46 form a concave curved side, preferably having a parabolic profile as it extends rearward from the tip 40.

Referring to FIGS. 3 and 5, when the air diverter 18 is assembled to the housing 16, the rounded corner 46 extends inwardly from lateral wall 28 and upwardly from the bottom wall 30. Similarly, when the air diverter 18' is assembled to the housing 16, its rounded corner extends inwardly from lateral wall 26 and upwardly from the bottom wall 30. Side 44d, which is a planar side, is in facing engagement with the lateral wall 28. That is, side 44d of the air diverter 18 is attached to the inner side surface of the lateral wall 28. In other words, the air diverter 18 is positioned adjacent or proximate an end of the cleaning fan 14.

Preferably, the tip 40 of the air diverter 18 is positioned proximal to the cleaning fan 14 and the base 42 of the air diverter is positioned distal to the cleaning fan 14. Additionally, the air diverter 18, including the tip 40, is positioned below the cleaning fan 14, and more preferably positioned below both the first outlet 24a and the cleaning fan 14. FIG. 3 illustrates the pair of air diverters 18, 18' positioned below the cleaning fan 14 and the first duct having the first outlet 24a. Furthermore, the pair of air diverters 18, 18' is positioned in front of or downstream the cleaning fan 14 for diverting the flow of air generated by the cleaning fan 14.

Referring back to FIG. 6, the air diverter 18 includes side 44c configured as a substantially planar side. Further, side 44c includes one or more traverse apertures 48 for the passage of a fastener (not shown) for fastening the air diverter 18 to the lateral wall 28. The air diverter 18 also includes an extension 50 extending from the base 42 of the air diverter 18. The extension is configured, as best shown in FIG. 6 and includes a wall 52 that extends from side 44b. The wall 52 is tangent to side 44b, which is a substantially planar inwardly facing wall of the air diverter 18, when assembled to the housing 16. As shown in FIG. 3, the extension is also configured to be received between a bottom portion 36b of the front wall 36 and the air baffle 38. Furthermore, side 44c is configured to be in facing engagement with the bottom wall 30 such that the tip 40 of the air diverter 18 is adjacent to an inner surface of the bottom wall 30.

Referring back to FIGS. 3 and 7, when the air diverter 18 is assembled to the housing 16, the distal end of side 44a extends in a direction of travel to the top portion 36a of the front wall 36 thereby creating a smooth transition of flow along the side 44a to the first duct and out to the first outlet 24a. As a result, the pair of air diverters 18, 18' diverts a portion of the flow of air generated by the cleaning fan 14 inwardly and upwardly to the first outlet 24a.

As shown in FIG. 8, the air diverter 18 is preferably configured as a hollow air diverter 18 having side 44d being an open side of the air diverter 18. Furthermore, referring the FIG. 6, the air diverter 18 is preferably configured as an asymmetric pyramid.

Figure 9:
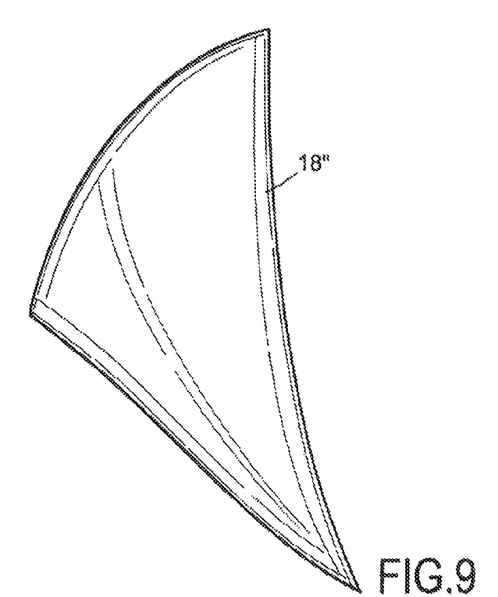
FIG. 9 is a perspective view of an air diverter in accordance with another preferred embodiment of the present invention.
Figure 10:
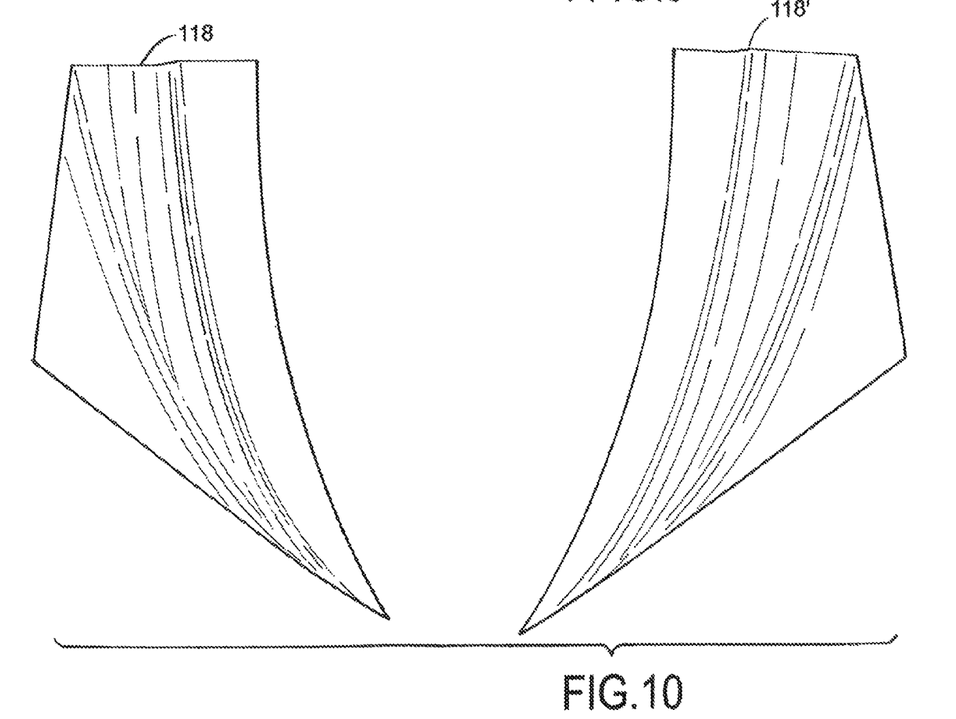
FIG. 10 is a perspective view of a pair of air diverters in accordance with yet another preferred embodiment of the present invention.

While the foregoing air diverter 18 is shown and configured having a substantially square pyramid shape, the air diverter can alternatively be configured as a substantially triangular pyramid shaped air diverter 18" with a rounded corner, and more preferably an asymmetric pyramid shape, as shown in FIG. 9. Further, the air diverter 18 can be optionally configured as air diverters 118, 118' without an extension, as shown in FIG. 10.

In operation, the cleaning fan 14 generates a flow of air which is directed through a first duct to the pre-sieve 108 and through a second duct to the upper and lower sieves 110, 112. In conventional combine harvesters 100, the air flow to the pre-sieve 108 is significantly less than the air flow directed towards the upper and lower sieves 110, 112. However, the air diverters 18 of the present invention advantageously provide for increased air flow and air velocity to the pre-sieve 108 thereby improving the overall performance of the combine's cleaning system 10.

Increased air flow to the pre-sieve 108 is accomplished by directing the flow of air generated by the cleaning fan 14 inwardly and upwardly. That is, the cleaning fan 14, which is typically an elongated traverse cleaning fan, generates a relatively thin flow of air that extends the entire length of the cleaning fan 14. Thus, as the flow of air generated comes in contact with the pair of air diverters 18, 18', owing to the profile and configuration of the air diverter, the flow of air is directed or deflected in an inwardly and upwardly direction relative to the position of the pair of air diverters 18, 18'. The deflection of the air flow in the inwardly and upwardly direction is facilitated by the smooth tapered surfaces of the air deflector side surfaces 44a, 44b and rounded corner 46. The smooth tapered surfaces of the air deflector side surfaces 44a, 44b and rounded corner 46 further promotes laminar flow of the air up towards the first duct, out through the first outlet 24a and to the pre-sieve 108.

Figure 11A:
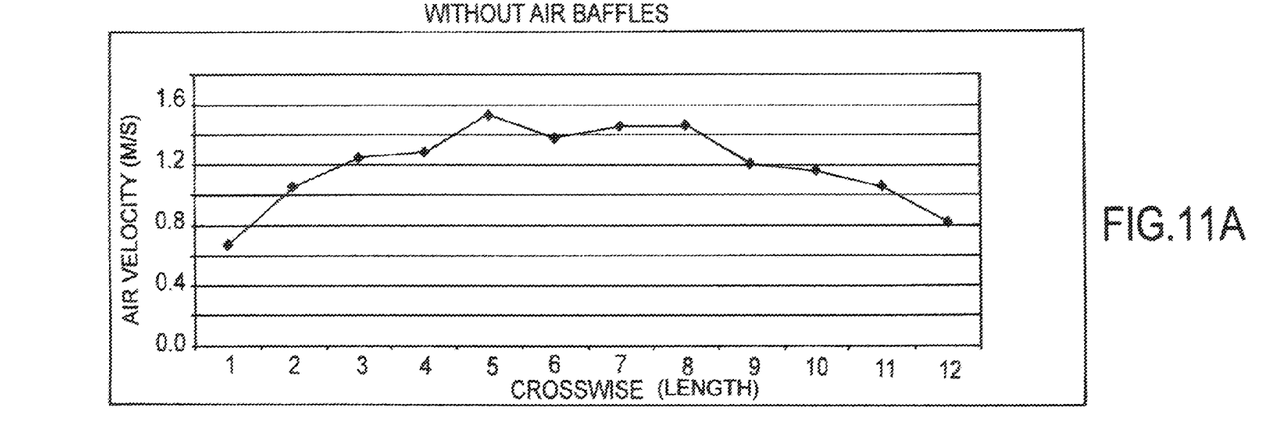
FIG. 11A is a chart of air velocity across a pre-sieve without air diverters installed.
Figure 11B:
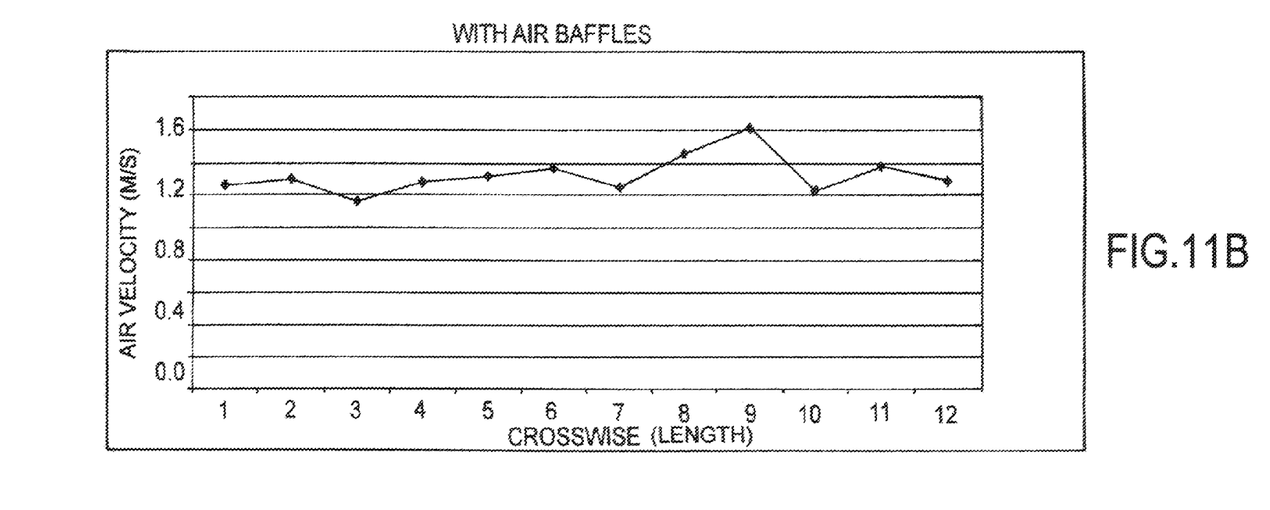
FIG. 11B is a chart of air velocity across a pre-sieve with air diverters installed.

As shown in FIGS. 11A and 11B, the present invention advantageously provides increased air flow and improved cross distribution of air flow over the pre-sieve 108. FIG. 11A is a chart of the air flow across a width of the pre-sieve 108 without air baffles 18, 18' while FIG. 11B is a chart of the air flow across a width of the pre-sieve 108 with air baffles 18, 18'. The measured average air flow velocity across a pre-sieve 108 without air baffles 18, 18' was 1.2 meters per second while the measured average air flow velocity across a pre-sieve 108 with air baffles 18, 18' was 1.3 meters per second. FIG. 11B in comparison to FIG. 11A also illustrates that that distribution of air flow across a width of the pre-sieve 108 is more uniform. That is, the standard deviation of air flow velocities across a width of the pre-sieve 108 when measured at various intervals across the width of the pre-sieve 108 is less with the air diverters 18, 18' in place than without the air diverters 18, 18'.

It will be appreciated by those skilled in the art that changes could be made to the embodiments described above without departing from the broad inventive concept thereof. For example, alternative or additional components and/or variations in geometry of the air diverters can be used. It is to be understood, therefore, that this invention is not limited to the particular embodiments disclosed, but it is intended to cover modifications within the spirit and scope of the present invention as defined by the appended claims.

We claim:

1. A cleaning system for a combine harvester comprising:
   a cleaning shoe having a sieve;
   a blower with a cleaning fan rotatably driven for generating a flow of air towards the cleaning shoe;
   a housing that houses the cleaning fan to form an air plenum extending across the entire length of the cleaning fan, the air plenum including:
      an inlet for the intake of air,
      an outlet downstream the inlet for directing the flow of air in a first direction,
      a bottom wall extending between lateral walls,
      the lateral walls, the bottom and a top wall forming a portion of the outlet; and
   two parallel and separate air diverters that minor image each other, and connected to the lateral walls, wherein a flow of air through the air plenum is split into two different airflows having separate directions, the separate directions consisting of an inward deflection and an upward deflection, the two parallel and separate air diverters for the inward deflection of a flow of air in the air plenum, the two parallel and separate air diverters further for the upward deflection of an air flow, each air diverter configured substantially as a pyramid having a rounded corner that extends inwardly from the lateral wall and upwardly from the bottom wall.

2. The cleaning system of claim 1, wherein each air diverter includes two planar sides at substantially right angles to each other.

3. The cleaning system of claim 1, wherein the rounded corner is a concave curved corner.

4. The cleaning system of claim 1, wherein each air diverter is substantially a square pyramid or a triangular pyramid.

5. The cleaning system of claim 1, wherein each air diverter includes at least two substantially planar sides and one curved side.

6. The cleaning system of claim 5, wherein at least one of the substantially planar sides is in facing engagement with the lateral wall.

7. The cleaning system of claim 1, wherein each of the separate air diverters is configured as an asymmetric pyramid.

8. The cleaning system of claim 7, wherein each of the separate air diverters has a base and a tip, and wherein the tip is positioned proximal to the cleaning fan and the base is distal to the cleaning fan.

9. The cleaning system of claim 8, wherein the tip of each of the separate air diverters is positioned below the cleaning fan.

10. A blower for a cleaning system of a combine harvester comprising:
    a fan for generating a flow of air;
    a housing for housing the fan to form an air plenum:
       an inlet,
       a first outlet downstream the inlet for directing the flow of air in a first direction,
       a second outlet downstream the inlet for directing the flow of air in a second direction, and
       walls forming at least a portion of the first and second outlets including lateral walls, a top wall and a bottom wall of the housing; and
    two parallel and separate air diverters that minor image each other and connected to the lateral walls, a flow of air through the air plenum being split into two different airflows having separate directions, the separate directions consisting of an inward deflection and an upward deflection, the two separate air diverters for the inward deflection of a flow of air in the air plenum, the two separate air diverters further for the upward deflection of an air flow; wherein each air diverter has a shape configured substantially as a pyramid having a rounded corner.

11. The blower of claim 10, wherein the first outlet is positioned above the second outlet and the air diverter diverts a portion of the flow of air inwardly and upwardly to the first outlet.

12. The blower of claim 10, wherein the air diverter is positioned below the first outlet.

13. The blower of claim 12, wherein the air diverter is positioned below the fan.

14. The blower of claim 10, wherein the air diverter is configured as an asymmetric pyramid.

15. The blower of claim 10, wherein the air diverter includes at least two substantially planar sides and one curved side.

16. The blower of claim 15, wherein the curved side of the air diverter is a concave curved side.

17. The blower of claim 10, wherein the air diverter further comprises an extension extending from a base of the pyramid, and wherein the extension has a wall tangent to a substantially planar inwardly facing wall of the pyramid.

18. The blower of claim 10, wherein the air diverter has a base and a tip, and wherein the tip is positioned proximal to the cleaning fan and the base is distal to the cleaning fan.

19. The blower of claim 10, wherein the tip of the air diverter is positioned below the cleaning fan.

20. The blower of claim 10, wherein the fan is an elongated fan and the air diverter is positioned proximate an end of the fan.

21. The blower of claim 10, wherein each of the two separate air diverters extend inwardly from the lateral wall of the housing.

* * * * *